United States Patent [19]

Moura et al.

[11] Patent Number: 5,347,304
[45] Date of Patent: Sep. 13, 1994

[54] REMOTE LINK ADAPTER FOR USE IN TV BROADCAST DATA TRANSMISSION SYSTEM

[75] Inventors: Eduardo J. Moura, San Jose; James C. Long, Sunnyvale, both of Calif.

[73] Assignee: Hybrid Networks, Inc., Cupertino, Calif.

[21] Appl. No.: 98,764

[22] Filed: Jul. 28, 1993

Related U.S. Application Data

[63] Continuation of Ser. No. 757,151, Sep. 10, 1991, abandoned.

[51] Int. Cl.$^5$ .............................................. H04H 1/00
[52] U.S. Cl. ........................................ 348/12; 348/13; 348/17; 455/5.1; 455/6.1
[58] Field of Search ............... 455/4.2, 5.1, 6.1, 6.2, 455/6.3; 358/84–86; 370/73, 76; 348/1, 12, 13, 15, 17; 375/36

[56] References Cited

U.S. PATENT DOCUMENTS

| | | | |
|---|---|---|---|
| 4,823,386 | 4/1989 | Dumbauld et al. | 358/86 |
| 4,829,569 | 5/1989 | Seth-Smith et al. | 358/86 |
| 4,894,789 | 1/1990 | Yee | 358/86 |
| 4,926,255 | 5/1990 | Von Kohorn . | |
| 4,987,486 | 1/1991 | Johnson et al. | 455/5.1 |
| 5,014,125 | 5/1991 | Pocock et al. | 455/4.2 |
| 5,093,718 | 3/1992 | Hoarty et al. | 358/86 |
| 5,247,347 | 9/1993 | Litteral et al. | 455/4.2 |

OTHER PUBLICATIONS

Descriptive material describing Row-Grabbing System of information retrieval developed by IDR.

*Primary Examiner*—Reinhard J. Eisenzopf
*Assistant Examiner*—Andrew Faile
*Attorney, Agent, or Firm*—Townsend and Townsend Khourie and Crew

[57] ABSTRACT

A hybrid transmission system is provided to transmit and receive high-speed digital information in the form of variable length packets using standard television practices and components. The basic building block of this hybrid digital transmission system is the device at the remote location that receives the analog broadcast TV-like signal processed by a standard vestigial sideband video modulator. This device decodes the digital information from the signal and then passes it along as digital information to any form of a data terminal equipment or computer.

9 Claims, 10 Drawing Sheets

REMOTE LINK ADAPTER FOR USE IN TV BROADCAST DATA TRANSMISSION SYSTEM

This is a continuation of application Ser. No. 07/757,151, filed Sep. 10, 1991, now abandoned.

BACKGROUND OF THE INVENTION

This invention relates generally to data transmission by television (TV) broadcast, and more particularly the invention relates to a remote link adapter for use in receiving broadcast data.

At the present time there is no cost effective method of delivering at high-speed packets of digital information to remote locations like homes and mobile vehicles. As used herein, digital information are packets that may contain multimedia data (sound, pictures, text, graphics, video) or executable computer code in addition to addressing status and protocol data. The existing telephone circuits, cellular systems and radio systems are just too slow to be practical and useful in an ever increasing number of digital multimedia applications including graphics, imaging, animation or remote windows. High-speed leased telephone lines and/or high-speed broadband switched digital service, offered by the telephone companies, are too expensive or not yet available to any average user (consumer) or potential user and do not address the needs of mobile users. In addition, all other existing forms of digital transmission techniques to the remote location (also known as the last mile) within any particular metropolitan area are too expensive and impractical to be useful at the present time. Most of these existing forms of high-speed digital transmission to the remote location are well known in the prior art but none of them attempt to use a low-cost, high-speed hybrid transmission scheme as described herein.

There are some existing forms of encoding digital information into the vertical blanking intervals (VBI) of a standard NTSC baseband TV signal, but again, these techniques provide severe difficulties with synchronization and the reception of digital information when it is delivered in the form of variable length data packets. These difficulties translate into higher costs at the receiving site, making those techniques also impractical when used to broadcast high-speed (greater then 10 Mbps) digital information in the form of variable length packets (also referred to herein as "addressable broadcasting" digital services) at very low cost.

This present invention relates to a very cost effective method of delivering high-speed (e.g., 10 Mega bits per second, Mbps, or higher) digital information in the form of packets to any remote location such as a home, school, office or mobile vehicle using standard TV practices and components and as part of a very comprehensive hybrid transmission system. More particularly, the invention provides a device for receiving broadcast data, transmitting the data to the end user, and communicating as necessary with the information provider.

SUMMARY OF THE INVENTION

Accordingly, an object of the invention is a practical method of transmitting and receiving high speed digital information at remote sites.

Another object of the invention is an adapter for receiving broadcast data.

Briefly, in accordance with the invention, a hybrid transmission system transmits and receives high-speed digital information in the form of variable length packets using standard television broadcast practices and components. The basic building block of this hybrid digital transmission system is the remote link adapter device at the remote location that receives the analog or digitally encoded broadcast signal processed by a standard television vestigial sideband video modulator. The device decodes the digital information from the signal and then passes it along as digital information to any form of a data terminal equipment or computer.

The remote link adapter includes a hybrid interface, a user interface, and a control means. The hybrid interface includes a radio modem for receiving the broadcast channel, and an optional return channel having a telephone modem, a radio link interface or a CATV interface for use in an on-demand addressable broadcast system. The user interface can include an Ethernet interface, a personal computer interface (e.g. PC/AT or MAC), or a direct bus into a video game system such as the Nintendo NES or Super NES. The control means includes a microprocessor, memory, and a stored control program.

The invention and objects and features thereof will be more readily apparent from the following detailed description and appended claims when taken with the drawings.

DETAILED DESCRIPTION OF THE ILLUSTRATIVE EMBODIMENTS

Figure 1:
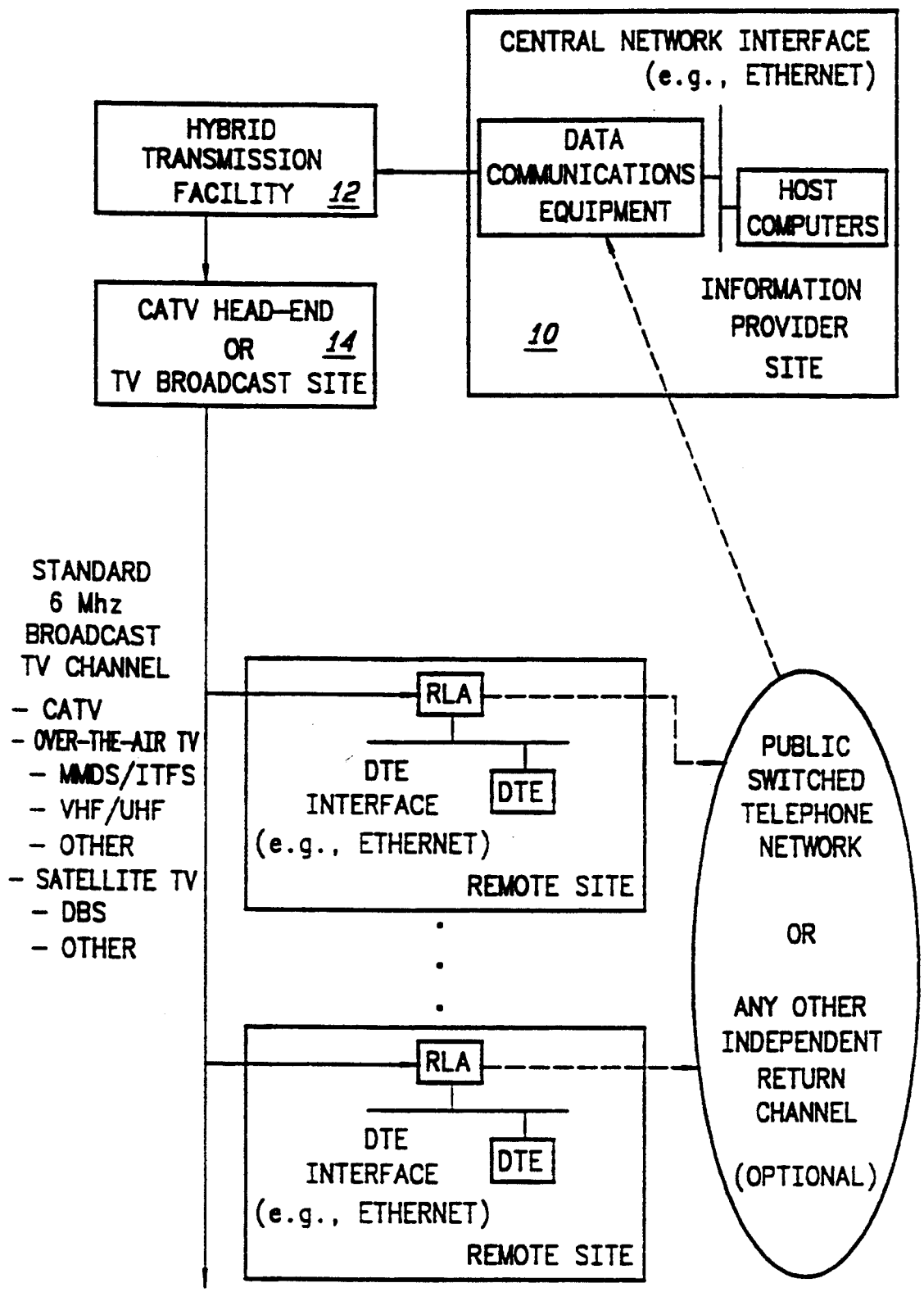
FIG. 1 is a functional block diagram of a data transmission system employing remote link adapters in accordance with the invention.

FIG. 1 is a functional block diagram of a data transmission system for broadcasting data to remote locations and employing remote link adapters in accordance with the invention. The system includes an Information Provider site 10, a Hybrid Transmission facility (HTF) 12, a CATV head-end or TV broadcast site 14 which transmits the data over a standard 6 Mhz television channel, and the Remote sites which receive the incoming digitally encoded broadcast signal.

The central site data communications equipment (DCE) at the Information Provider's site sends a high-speed digital signal to the Hybrid Transmission Facility (HTF) via any suitable high-speed line or media. In the case where the Information Provider's site is co-located with the HTF, the connection between the central site DCE and the HTF can be a short piece of coaxial cable.

The HTF receives the incoming high-speed digital signal, combines it with other incoming high-speed digital signal (using local area network-LAN-based fast-packet switching techniques) to the appropriate outgoing port for broadcasting purposes. The signal is then transmitted to the appropriate head-end location or over-the-air TV broadcast site either as an analog signal or as a digital signal. Again, the head-end site or TV broadcast site could be co-located with the HTF.

Before the digital signal is broadcast over the air or transmitted downstream throughout a cable television (CATV) network, the digital signal is first encoded into a standard 1 volt peak-to-peak, baseband input into a standard video modulator. The signal is then processed by the video modulator just like it processes a standard 1 volt peak-to-peak baseband television input signal and is then transmitted over a standard 6 Mhz television channel.

The Remote Link Adapter (RLA) at the remote site receives the incoming TV-like analog signal using a built-in standard TV tuner/receiver. After processing the signal, the RLA presents the resulting digital signal to the data terminal equipment (DTE) interface. When a return channel is present, the RLA also forwards digital information (packets) to the central site using the return channel. The return channel(s) can be a standard public switched network telephone line(s) operating at a different speed from the forward broadcast channel or any other available channel, such as a radio channel, or the CATV system itself.

Finally, if a return channel is present, the central site DCE will receive the incoming digital information (packets) from the return channel and forward them to the central network interface to complete the circuit. However, if a return channel is not present, the RLA simply selects digital information (packets) from the high-speed forward broadcast channel based on a specific selection criteria defined by software. A hybrid system as described herein without a return channel is also known as a "selectable addressable broadcast system". A hybrid system as described herein with a return channel is also known as a "on-demand addressable broadcast system". One of the unique characteristics of the hybrid system is that the forward broadcast channel is completely independent from any form of a return channel. This feature allows each channel to be optimized independently from the other.

FIGS. 2-5 are functional block diagrams of embodiments of the RLA. The RLA receives the high-speed analog signal from the 6 Mhz broadcast TV channel, processes the signal and then delivers the resulting digital signal to a specific DTE interface. Physically, the RLA will either be a small standalone box or a printed circuit card (PC board) that can be mounted inside any number of DTE units including computers, workstations, home computers, interactive graphics terminals or simple video game machines.

Figure 2:
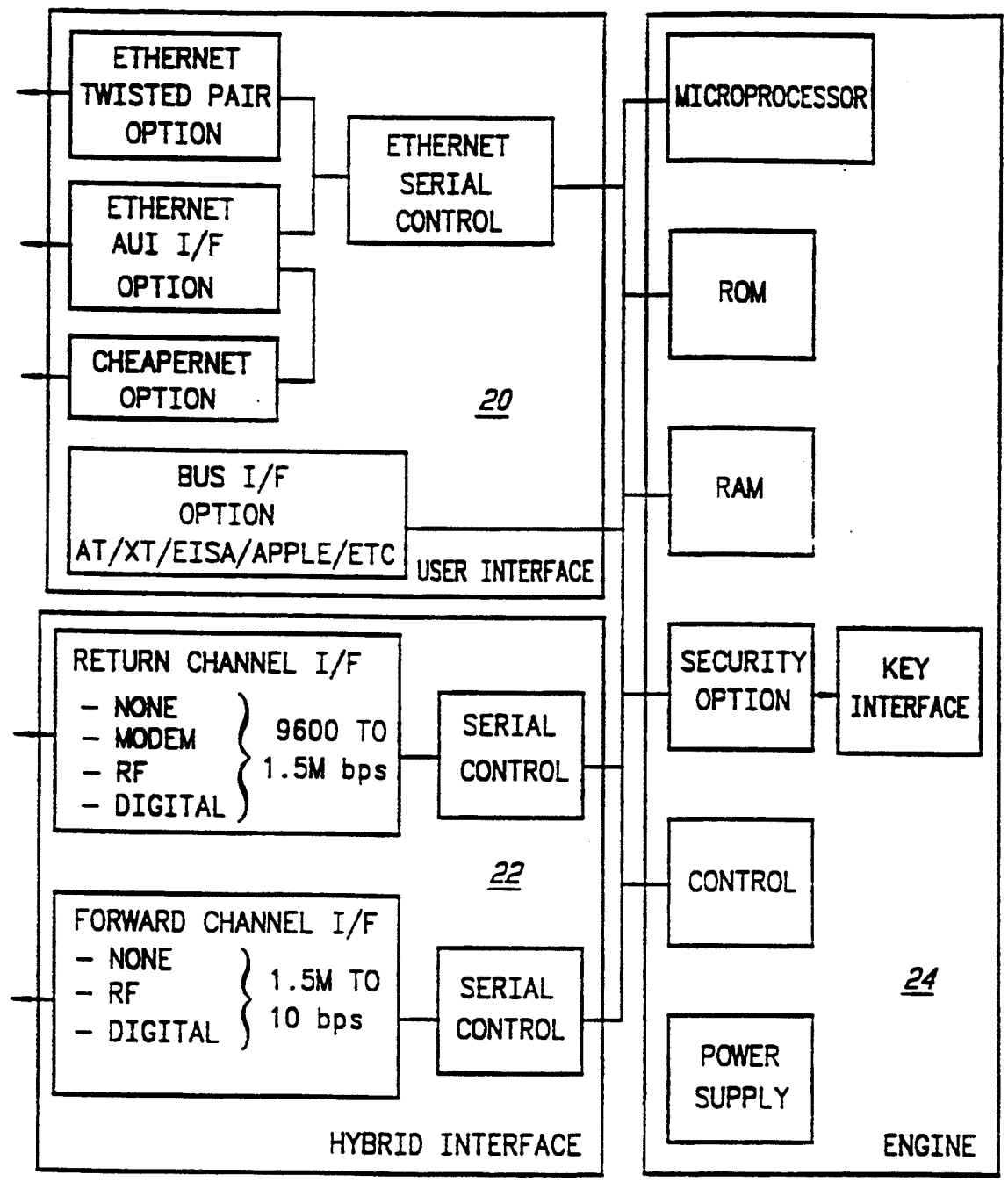
FIG. 2 is a functional block diagram of a remote link adapter as used in the system of FIG. 1.

FIG. 2 illustrates the basic building blocks for the RLA. As illustrated, the overall RLA design consists of three basic parts: (1) The User Interface 20 which is also sometimes referred to as The DTE Interface, (2) The Hybrid Interface 22 which includes the forward broadcast channel and an optional return back channel, and (3) The control means or The Engine 24 which includes the microprocessor, memory, control and optional security portions of the RLA.

Figure 3:
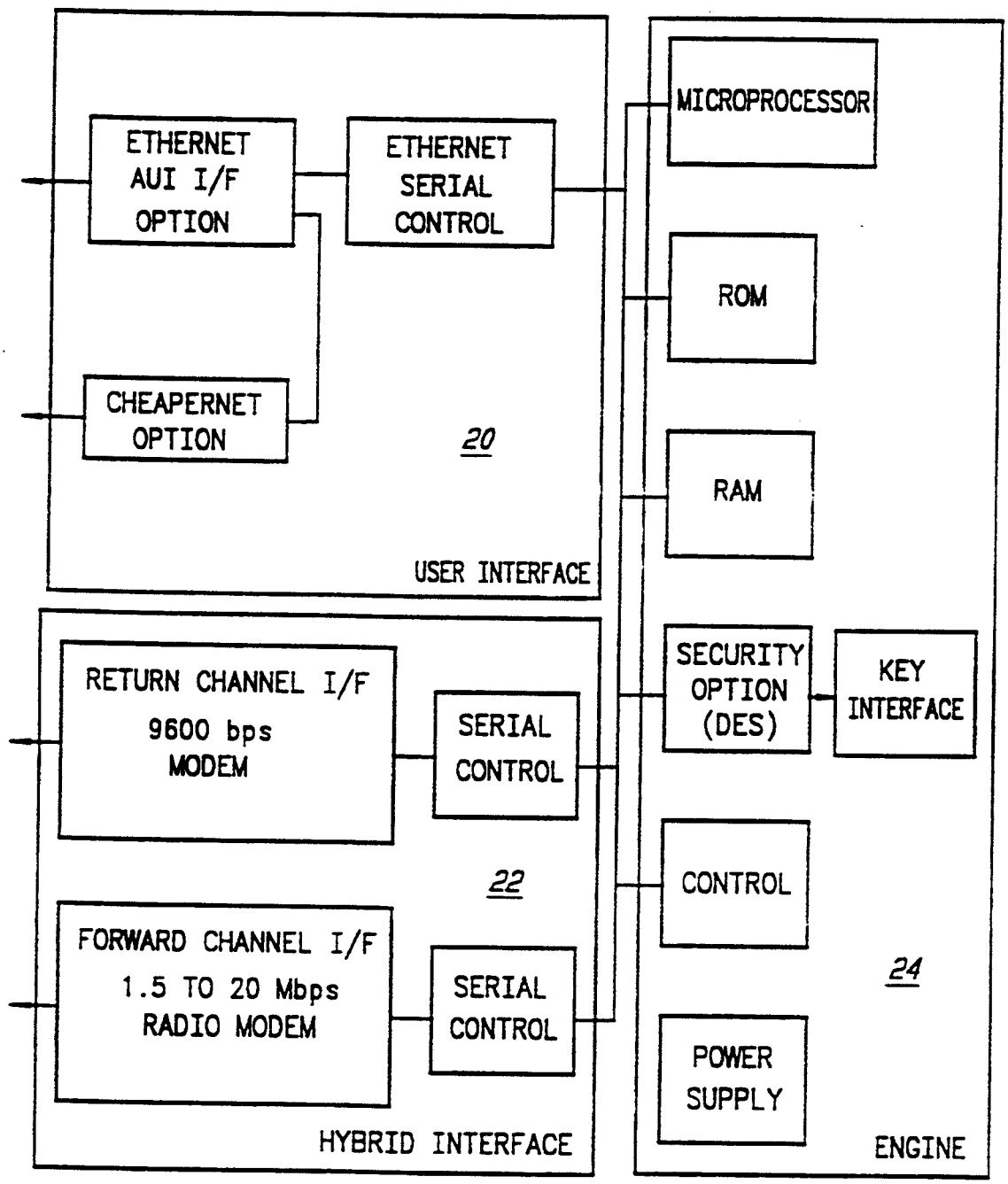
FIGS. 3-5 are functional block diagrams of three different embodiments of the remote link adapter illustrated in FIG. 2.

FIG. 3 illustrates the implementation of a fully configured RLA. In this implementation, the user interface 20 is Ethernet, the hybrid interface 22 is a high-speed (approximately 10 Mbps) RF modem used to receive the forward broadcast channel and a built-in 9600 bps telephone modem used to transmit the return channel. The engine 24 of the RLA is a standard Intel microprocessor with associated read only memory (ROM), random access memory (RAM) and a digital encryption standard (DES) co-processor chip-set used to decipher the incoming digital information from the broadcast channel. This RLA device is a small standalone box with an Ethernet interface, an RF "F" connector interface to receive the high-speed broadcast channel, and an RJ-11 telephone jack used for the return channel.

Figure 4:
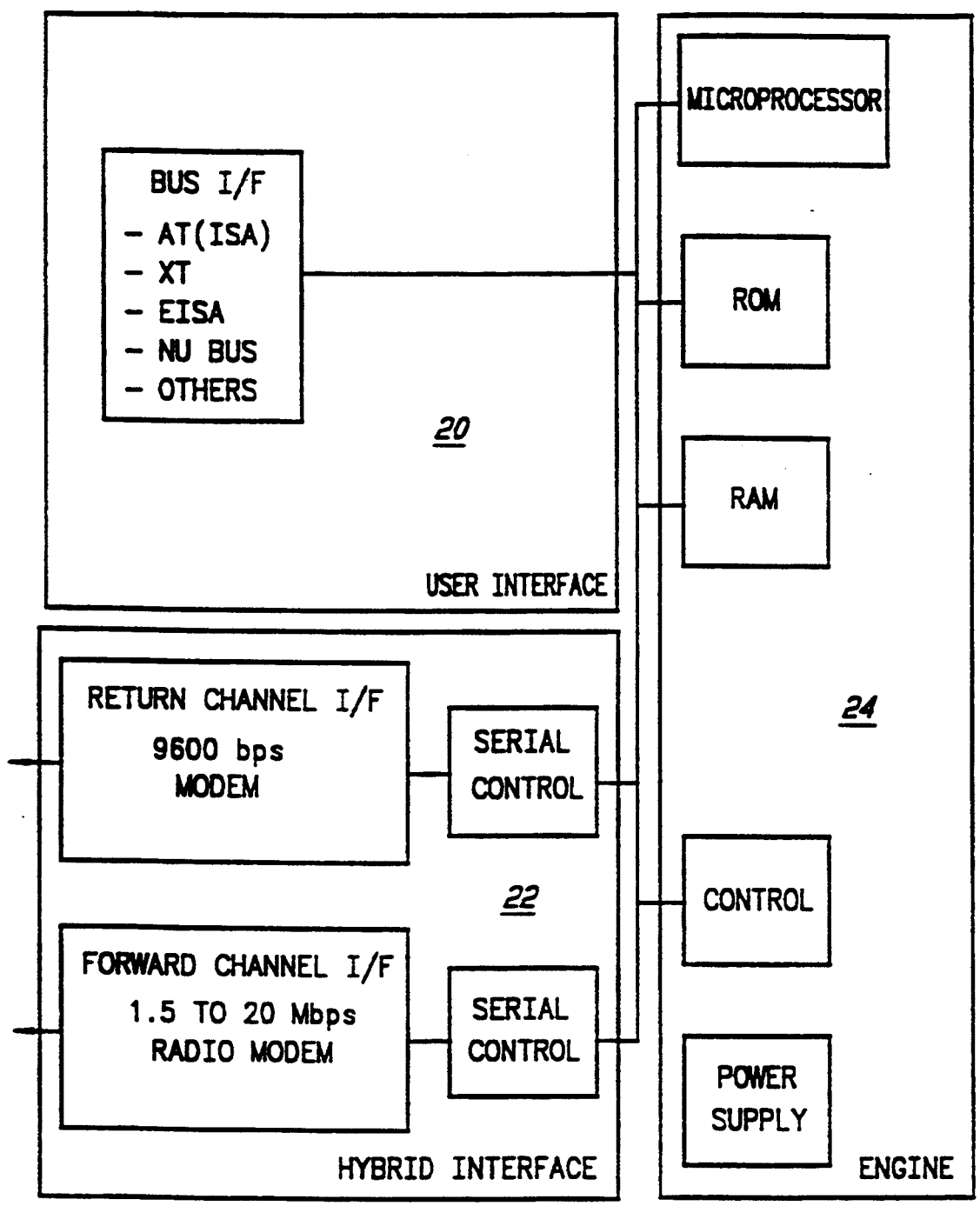

FIG. 4 illustrates the implementation of the RLA for use with a personal computer bus. In this case, the user interface 20 is a direct computer bus interface. The hybrid interface 22 of this embodiment is identical to the implementation of FIG. 2 but the engine 24 is a less capable microprocessor with a smaller amount of ROM and RAM and no encryption co-processor.

This RLA device is a PC board form factor product that interfaces directly with either a PC-AT bus (model 200-001), a MacII bus (model 200-002) or a PS/2 bus (model 200-003). The PC board also provides an RF "F" connector to receive the high-speed broadcast signal and an RJ-11 telephone jack for the return channel.

Figure 5:
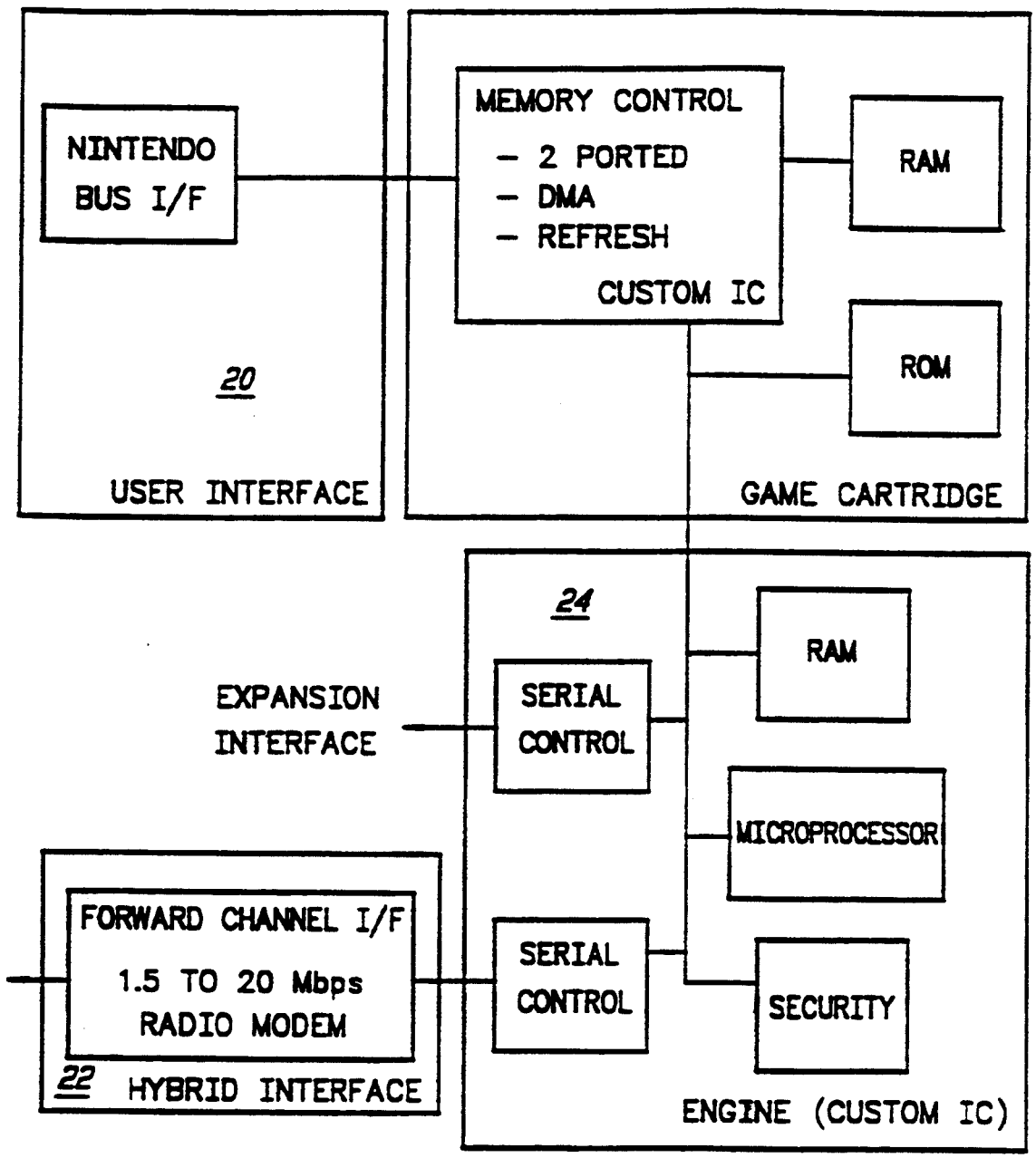

FIG. 5 illustrates the implementation of the RLA for use with a video game machine such as the Nintendo NES or Super NES. This implementation is the lowest cost implementation of the RLA. The user interface 20 is a direct bus interface into the NES or Super NES. In this implementation, the memory and memory control portions of the RLA are implemented in the form of a standard NES or Super NES video game cartridge. The memory control function 24 uses a single VLSI custom chip. The hybrid interface is a very low-cost high-speed (approximately 10 Mbps) RF modem, with no return channel and the engine is another single VLSI custom integrated circuit (IC). Finally, an optional expansion interface is also provided in case a future return channel upgrade is required. The same expansion port may also allow for the attachment of an external printer or an external bulk storage device or other peripherals. This RLA device is packaged in a small plastic enclosure that connects directly to a Nintendo NES or Super NES video game machine. The device provides an RF"F" connector to receive the high-speed broadcast channel and an optional expansion port. A return channel will normally not be available in this RLA implementation.

The RLAs described in accordance with this invention are designed to operate in a hybrid transmission system with a specific forward broadcast channel ("IN Channel") protocol. The IN Channel protocol specifies the rules used by the RLAs to receive and filter the relevant digital information (packets) flowing in the forward broadcast channel. Each RLA has a unique digitally encoded address. RLAs are capable of receiving broadcast packets, multicast packets (packets addressed to groups of users/RLAs) and packets specifically addressed to them. The forward broadcast channel (IN Channel) is a shared channel. Many RLAs may share the same channel to receive digital information. When an RLA is powered up and the RF modem is appropriately tuned to a particular IN Channel (6 Mhz broadcast TV Channel), the RLA modem automatically synchronizes to the incoming high-speed data being broadcast and starts monitoring (receiving) the incoming signal. The RLA firmware, after its initial power-up and self test sequence, instructs the RLA to look for a particular address or set of addresses (e.g., broadcast packets). Once packets with these addresses are detected, the RLA then forwards the appropriate incoming packets to the DTE for further processing.

Selectable Broadcast—All RLA units receive the main-menu packet from the channel. Then, based on user selections, the RLA units filter the appropriate broadcast packets from the channel in the next broadcasts. Broadcasts are repeated periodically. Based upon the nature of the digital data, certain packets are re-broadcast approximately every other second while other packets are re-broadcast approximately every minute. The information contained in a particular broadcast cycle (sequence of packets) will also change with time.

On-Demand Broadcast—Users request a particular set of information (packets) in accordance with any given data communications protocol supported by The IN Channel. The RLA will support most standard and defacto protocols that run over a standard IEEE-802.3 Ethernet local area network. The following are the different types of on-demand calls that can be set-up using The IN Channel:

a. Broadcast/Multicast—The Information Provider broadcasts or multicasts the information to the particular user or group of users. No call set-up is required. The request for information is completely asynchronous from the delivery of information;

b. Secure Sessions—This is the most complex procedure since it involves the distribution of encryption keys;

c. Non-secure sessions—This procedure is identical to the procedures currently used by existing network applications. The IN Channel is transparent to most LAN-based network applications;

d. Interactive sessions for the Consumers—These procedures are determined by the different Information Providers, who decide to use the IN Channel to deliver their services.

For on-demand applications—The RLA shown in FIG. 3 goes through an initial call set-up/security procedure before it becomes operational. First, the user dials a particular telephone number. Dial-back security and user authentication will be optional at this stage. Once the central site DCE (located at the Information Provider's site) answers the call, the RLA goes through a security protocol (encryption key distribution) if used in the system. Next a link layer connection is established between the central site DCE and the remote RLA. This connection remains transparent to the applications running above. The hybrid connection looks like a transparent remote Ethernet bridge and, therefore, is compatible with all upper layer protocols (e.g., TCP/IP, AppleTalk, ISO, DECNET, etc.) that can run over Ethernet. Once the connection is established, the remote user can now run standard network applications just as if the user were located at the central site local area network. The hybrid connection is terminated by hanging up the telephone side of the connection (the return channel).

The RLA shown in FIG. 4 series also goes through an initial call set-up procedure before it becomes operational. Again, first, the user dials a particular telephone number. Dial back security and user authentication will be optional at this stage. Once the central site DCE answers the call, a link layer connection is established between the central site DCE and the remote RLA. Since the remote RLA is a PC board that fits inside a particular personal computer, specific network driver software is required by the RLA. Network applications need to be ported to the hybrid network driver in order to be able to run over the hybrid connection.

The RLA shown in FIG. 5 normally does not go through a call set-up procedure since no return channel is used. This embodiment operates in accordance with the IN Channel protocol.

The IN Channel uses a protocol that controls the flow of information and the addressing in the channel. All RLAs will have a unique address. In addition, the RLAs will also be able to receive broadcast and multicast messages (packets). The following is a list of the different types of packets that can flow in the IN Channel:

1. Broadcast packets (including selectable broadcast packets)
2. Multicast packets
3. On-Demand Addressable packets
   Secure Packets
   Non-secure Packets
   Network Management Packets
4. Addressable video frame packets (followed by one or more NTSC video frames)

The channel transports variable length data packets. Packet multiplexing techniques are primarily based on a FIFO (first in first out) scheme as a direct feed from a LAN Switch port. A priority scheme is given to certain packets, including selectable broadcasts and some network management packets. The IN Channel operates in a synchronous mode. Both on-demand and selectable broadcast traffic is transported in the IN Channel at the same time. Bandwidth management is performed by the equipment at the Hybrid Regional Distribution Centers.

The digital information (packets) carried by The IN Channel are transparent to the applications. Standard upper-layer protocols such as: TCP/IP, NFS, X-Windows, AppleTalk, Netware and ISO will be able to run unchanged over the IN Channel. However, upper-layer protocol optimization and/or new upper-layer protocols may be used for consumer-based applications.

The information flowing in The IN Channel is packaged in packets. Each packet contains the address of the subscriber (destination address) and the source address (optional). LAN-based fast packet switching and multiplexing techniques will be used to process and transport information in the channel. Off-the-shelf packet switching equipment can be used at the regional distribution centers.

The hybrid data transmission system return channel is optional. It needs to be used, however, when running real-time interactive applications. The return channel protocol provides data compression needed to improve the performance of high-speed interactive applications.

The packet-data delivery via The IN Channel has a specific error rate. The IN Channel is a datagram, packet-based transport system. This system relies on the bandwidth and services provided by the CATV (cable or wireless) operators. Error recovery is achieved by the end-to-end transport layer protocol running in the data terminal equipment (DTE). A good example here is TCP/IP. For selectable traffic, packets with CRC errors will be dropped. They will be received by the RLA on the next re-broadcast.

Figure 6:
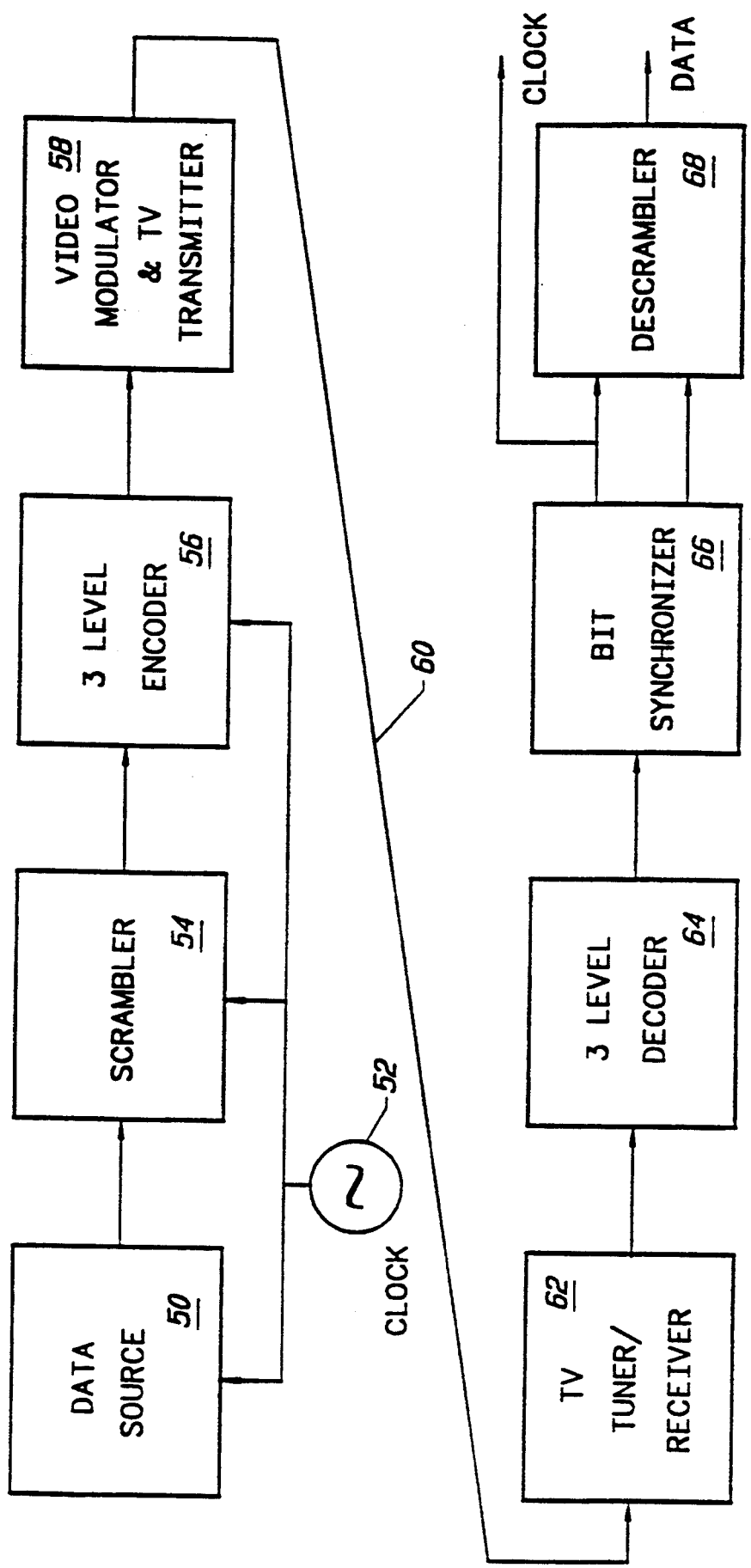
FIG. 6 is a functional block diagram of the RF portion of the data transmission system of FIG. 1.

FIG. 6 shows the signal path from the head end cable TV transmitter site to a typical terminal. The system translates between NRZ baseband digital stream at the input to a modulation form suitable for use on a standard CATV head end modulator, and translates the received signals from a standard TV tuner connected to a cable TV network to baseband NRZ data stream and a regenerated clock. A TV tuner containing only those features required for receiving the digitally modulated CATV signal is used. The design is adaptable to a range of bit rates.

The data source 50 can be any baseband NRZ data stream. The clock 52 can be part of the system or supplied by the data source. The scrambler 54 takes a data stream supplied by the user and exclusively ORs the stream with a pseudorandom pattern which is a function of the past data. This breaks up periodic bit patterns which would degrade the bit synchronizer functioning.

The 3 level encoder 56 takes in a NRZ bit stream and clock and converts it to a more bandwidth efficient class IV partial response 3 level format. The output is not bandwidth limited because the CATV modulator contains SAW filters that produce the bandwidth limiting without any added phase distortion. A format that does not contain spectral terms at DC is used so that the CATV modulator and tuner not having a frequency response down to DC will not be a hindrance. The TV transmitter 58 is a standard unit commonly used in CATV or over the air TV systems. It takes a baseband video signal and converts it to any commonly used TV format or digitally encoded vestigial sideband signal.

The TV distribution network 60 can be any distribution system used to distribute TV signals. It can be electrical cable, optical cable, or over the air radio or microwave or direct broadcast satellite. The broadcast signal containing the data is converted to baseband by a TV tuner 62 with only those portions necessary to receive the digitally modulated signal from the TV distribution network and produce a baseband video output consisting of the 3 level baseband signal. The 3 level decoder 64 takes the 3 level signal from the video output of the TV tuner 62 and converts it into two level NRZ data using a clock produced by the bit synchronizer 66. The bit synchronizer 62 regenerates the data clock from the video output of the TV tuner. The descrambler 68 takes in the data stream from the scrambler (after being modulated, transmitted, received, and demodulated by the RF components) and recovers the original data stream.

Figure 7A:
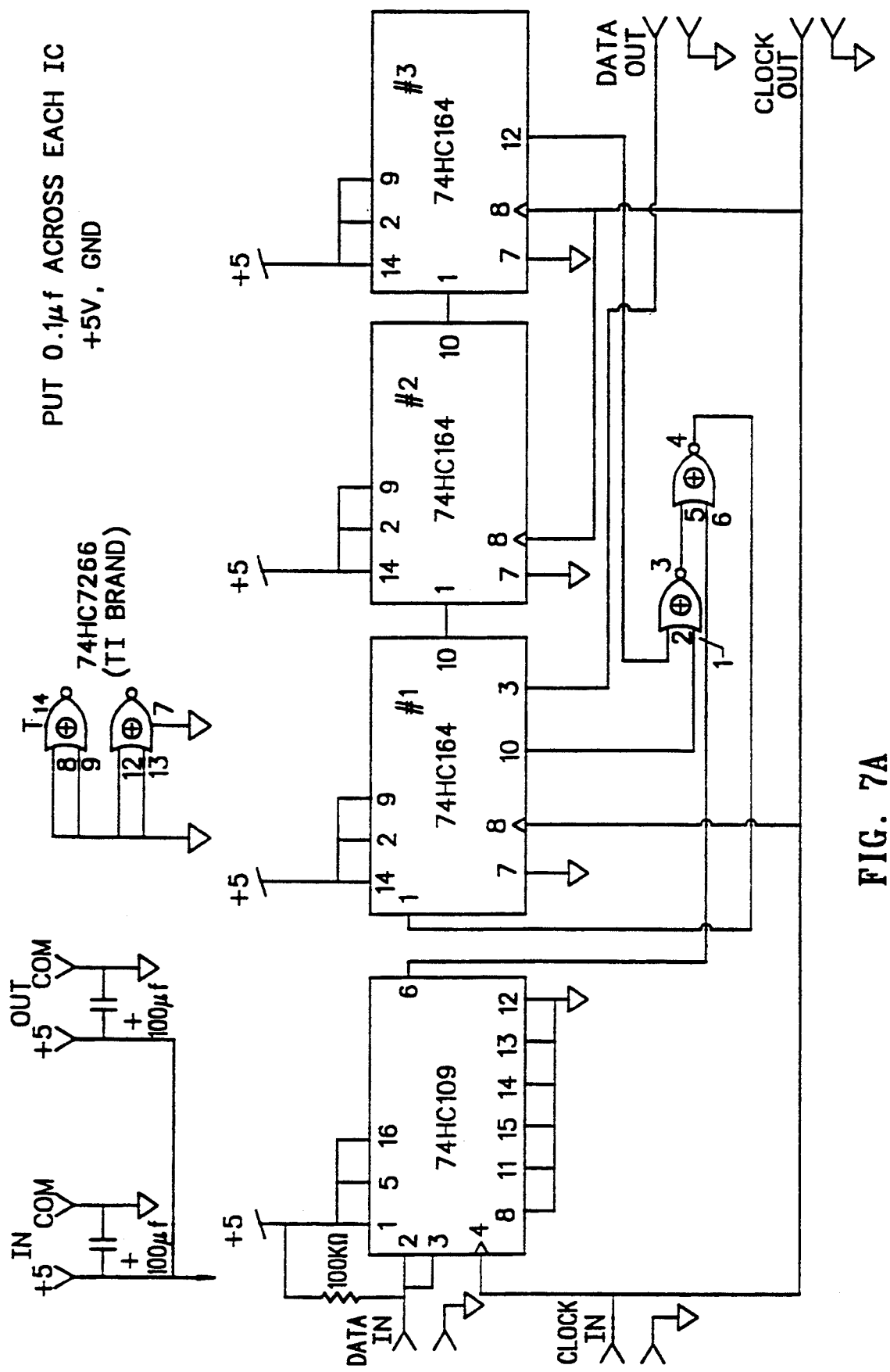
FIG. 7A is a schematic of a data scrambler and FIG. 7B is a schematic of a data descrambler as used in FIG. 6.

FIG. 7A is a schematic of one embodiment of the scrambler. The scrambler takes input data and XORs the data with a 23 bit PRNG sequence to make it more random. The circuit is designed as a two port network. Clock and data go to the input, and clock and scrambled data come from the output which matches the inputs on the 3 level encoder. The circuit performs an additional function as a test pattern generator. The pull up resistor on the data input provides all ones which produces a PRNG output.

Figure 7B:
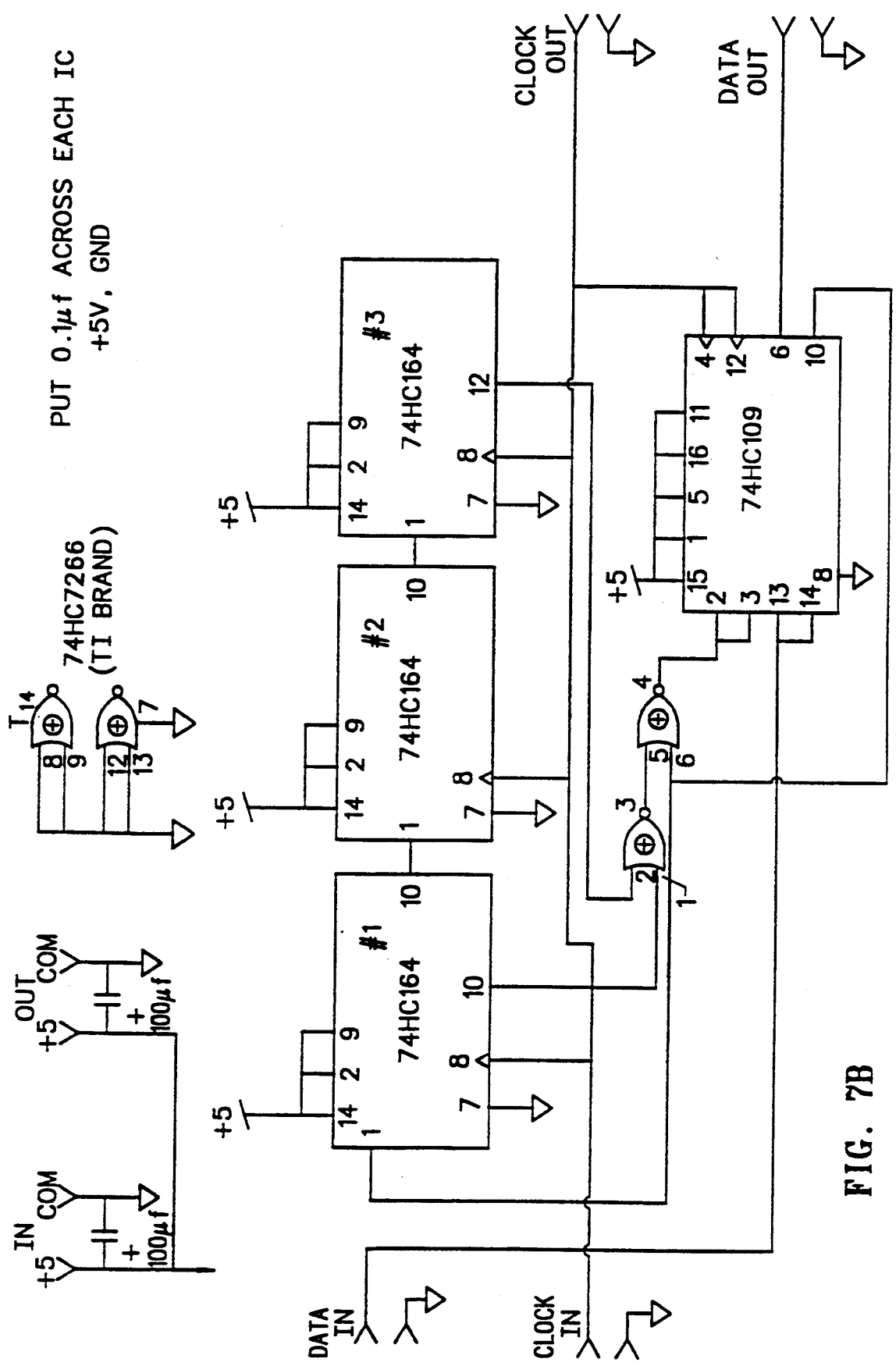

The descrambler shown schematically in FIG. 7B performs the inverse function of the scrambler. It is designed as a two port network with clock and scrambled data going in the input, and clock and data coming from the output.

Figure 8A:
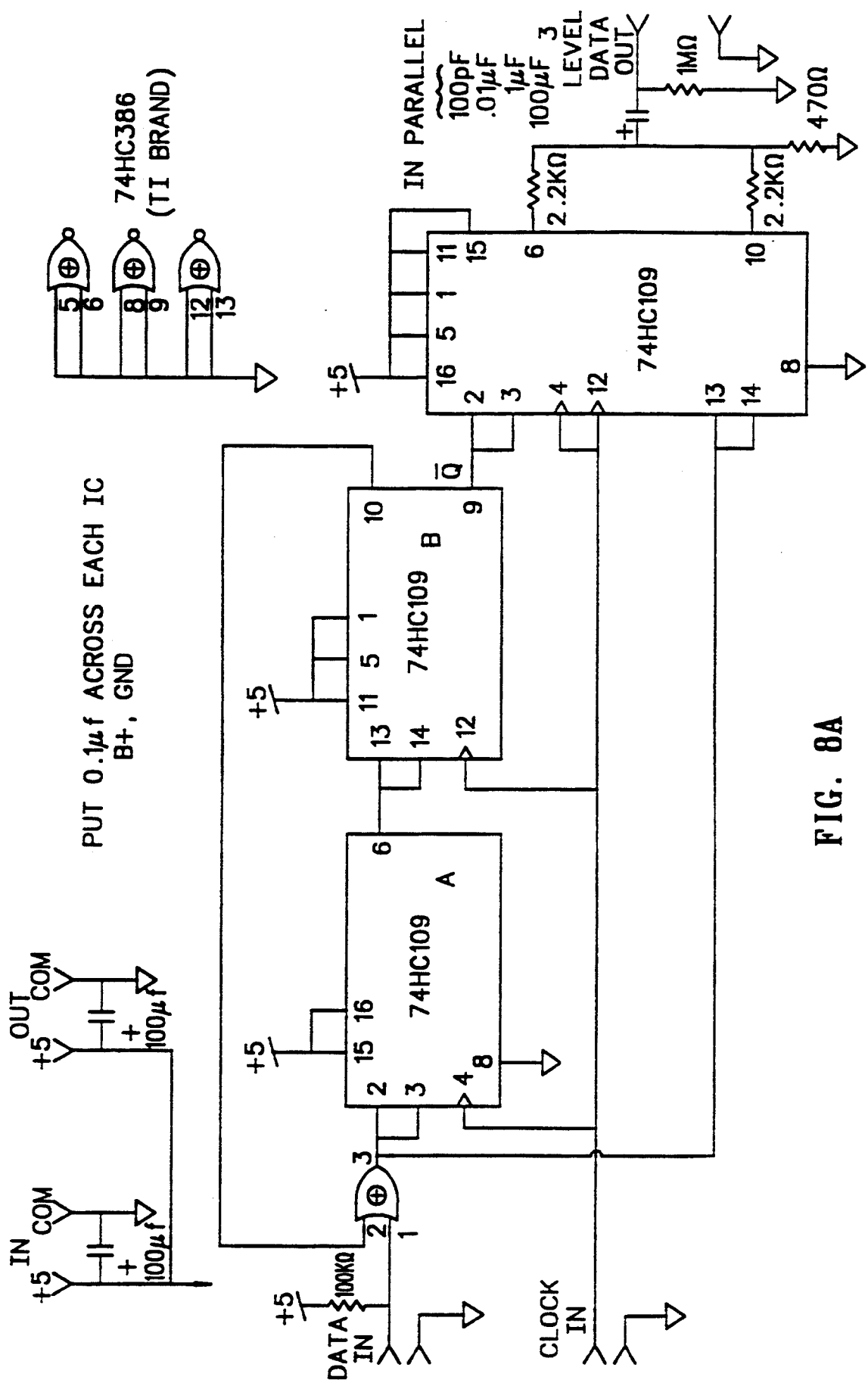
FIG. 8A is a schematic of a three level encoder.

FIG. 8A is a schematic of the three level encoder. It uses class 4 duobinary encoding format created by subtracting a 2 bit delayed version of the input from itself. A zero input produces a middle level output and a one input produces one of the extreme levels. The second and subsequent one in a sequence keeps the output at the same level as caused by the first one.

Figure 8B:
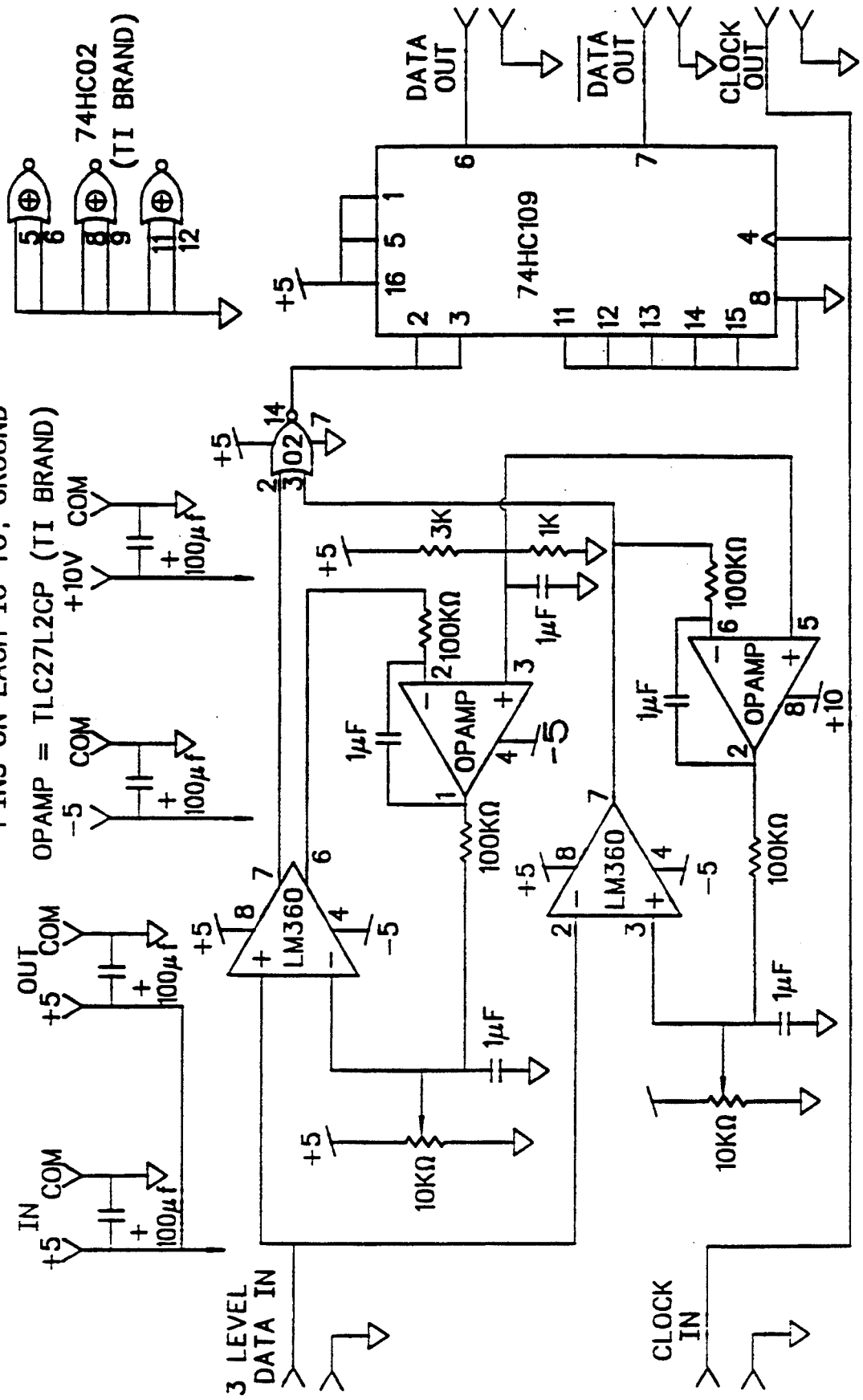
FIG. 8B is a schematic of a three level decoder as used in FIG. 6.

FIG. 8B is a schematic of the three level decoder. It uses comparators to detect the three levels. The voltage levels for comparison are set by a combination of two items. The first is a factory set trimpot. Small adjustments around this value are set by a feedback network that tries to make the two extreme voltage level outputs (ones) occur 25% of the time. This is the situation that exists with random data such as produced by scrambled data. The data is sampled at the proper time by a locally regenerated clock.

There has been described a Remote Link Adapter used to receive high speed data transmitted by television broadcast. The RLA can be employed in interfacing with a LAN, an individual personal computer, or a video game machine. While the invention has been described with reference to specific embodiments, the description is illustrative of the invention and is not to be construed as limiting the invention. Various modifications and applications may occur to those skilled in the art without departing from the true spirit and scope of the invention as defined by the appended claims.

What is claimed is:

1. In a high speed digital information transmission system in which multi megabit per second digital data is addressably broadcast using contiguous bandwidth in a television channel to a remote site, a remote link adapter comprising a hybrid interface for receiving and demodulating a multi megabit per second digitally encoded signal to verify an address and obtain the transmitted digital data, said hybrid interface providing a full duplex asymmetric network connection which is constructed from independent forward and return transmission channels in two directions, a user interface for providing said digital data to data terminal equipment, microprocessor control means for controlling said hybrid interface in accordance with protocols for controlling the flow of said digital data and the addressing in the forward and return transmission channels, and a bus interconnecting said user interface, said hybrid interface, and said microprocessor control means.

2. The remote link adapter as defined by claim 1 wherein said return channel includes a telephone line modem.

3. The remote link adapter as defined by claim 1 wherein said return channel includes a radio interface.

4. The remote link adapter as defined by claim 1 wherein said return channel includes a CATV interface.

5. The remote link adapter as defined by claim 1 wherein said user interface includes an Ethernet interface, said digital data are broadcast at multi megabit per second data rates using the frequency spectrum of a 6 MHz television channel, and said return channel is provided by an independent transmission path with data transmission rates of at least 9600 bits per second whereby said remote link adapter operates in a high speed asymmetric data transmission system.

6. The remote link adapter as defined by claim 1 wherein said user interface includes a personal computer bus interface.

7. The remote link adapter as defined by claim 1 wherein said user interface interfaces with a video game system.

8. The remote link adapter as defined by claim 1 wherein said hybrid interface includes an RF modem.

9. The remote link adapter as defined by claim 1 wherein said microprocessor control means controls the addressing of said hybrid interface and the flow of data in said bus to any number of multiple users connected to the user interface.

* * * * *